United States Patent [19]

Kronzer et al.

[11] Patent Number: 5,716,900
[45] Date of Patent: Feb. 10, 1998

[54] HEAT TRANSFER MATERIAL FOR DYE DIFFUSION THERMAL TRANSFER PRINTING

[75] Inventors: Francis Joseph Kronzer; Jerry Wayne Estes, both of Marietta, Ga.

[73] Assignee: Kimberly-Clark Worldwide, Inc., Neenah, Wis.

[21] Appl. No.: 432,290

[22] Filed: May 1, 1995

[51] Int. Cl.$^6$ .......................... B41M 5/035; B41M 5/38
[52] U.S. Cl. .................. 503/227; 428/195; 428/211; 428/212; 428/409; 428/913; 428/914
[58] Field of Search .................................. 8/471; 428/195, 428/913, 914, 211, 212; 503/227

[56] References Cited

U.S. PATENT DOCUMENTS

| | | | |
|---|---|---|---|
| 4,757,047 | 7/1988 | Kosaka | 503/227 |
| 4,778,782 | 10/1988 | Ito et al. | 503/227 |
| 4,837,200 | 6/1989 | Kondo et al. | 503/227 |
| 4,853,365 | 8/1989 | Jongewaard et al. | 503/227 |
| 5,053,381 | 10/1991 | Chapman et al. | 503/227 |
| 5,055,444 | 10/1991 | Kaszczuk | 503/227 |
| 5,077,263 | 12/1991 | Henzel | 503/227 |
| 5,095,000 | 3/1992 | Kawasaki et al. | 503/227 |
| 5,096,876 | 3/1992 | Jahn et al. | 503/227 |
| 5,157,013 | 10/1992 | Sakai | 503/227 |
| 5,242,739 | 9/1993 | Kronzer et al. | 428/200 |
| 5,252,533 | 10/1993 | Yasuda et al. | 503/227 |
| 5,271,990 | 12/1993 | Kronzer et al. | 428/195 |
| 5,280,005 | 1/1994 | Nakajima et al. | 503/227 |
| 5,281,573 | 1/1994 | Kawasaki et al. | 503/227 |
| 5,300,398 | 4/1994 | Kaszczuk | 430/200 |
| 5,344,808 | 9/1994 | Watanabe et al. | 503/227 |
| 5,372,987 | 12/1994 | Fisch et al. | 503/227 |
| 5,387,574 | 2/1995 | Campbell et al. | 503/227 |

*Primary Examiner*—Bruce H. Hess
*Attorney, Agent, or Firm*—William E. Maycock

[57] ABSTRACT

A printable material which includes a first, second, and third layer. The first layer has first and second surfaces. For example, the first layer may be a film or a cellulosic nonwoven web. The second layer overlays the first surface of the first layer. The second layer is composed of a first thermoplastic polymer having a melt flow rate of at least about 15 g/10 minutes at a temperature of 190° C. and a load of 2.16 kg. The third layer overlays the second layer. The third layer includes a second thermoplastic polymer having a glass transition temperature equal to or greater than about 30° C. The third layer also may include from about 1 to about 40 parts by weight, per 100 parts by weight of the second thermoplastic polymer, of a release agent. Desirably, the first and second layers will have smoothness values, as measured by a Sheffield Smoothness Tester, no greater than about 150 cc/minute and no greater than about 100 cc/minute, respectively. The third layer may contain up to about 150 parts by weight, per 100 parts by weight of the second thermoplastic polymer, of a plasticizer, and up to about 100 parts by weight, per 100 parts by weight of the second thermoplastic polymer, of a polymeric adhesion-transfer aid. The printable material is especially suitable for use as a dye diffusion thermal transfer printable heat transfer material.

34 Claims, No Drawings

HEAT TRANSFER MATERIAL FOR DYE DIFFUSION THERMAL TRANSFER PRINTING

BACKGROUND OF THE INVENTION

The present invention relates to a printable material, such as a heat transfer material.

In recent years, a significant industry has developed which involves the application of customer-selected designs, messages, illustrations, and the like (referred to collectively hereinafter as "customer-selected graphics") on articles of clothing, such as T-shirts, sweat shirts, and the like. These customer-selected graphics typically are commercially available products tailored for that specific end-use. The graphics typically are printed on a release or transfer paper. They are applied to the article of clothing by means of heat and pressure, after which the release or transfer paper is removed.

Some effort has been directed to allowing customers the opportunity to prepare their own graphics for application to an article of clothing. For example, the preparation of such graphics may involve the use of colored crayons made from a heat-transferable material. Such crayons may be provided in kit form, which also includes an unspecified heat transfer sheet having an outlined pattern thereon. In a variation of the kit, the transferable pattern is created from a manifold of a heat transfer sheet and a reverse or lift-type copy sheet having a pressure transferable coating of heat transferable material thereon. By generating the pattern or artwork on the obverse face of the transfer sheet with the pressure of a drafting instrument, a heat transferable mirror image pattern is created on the rear surface of the transfer sheet by pressure transfer from the copy sheet. The heat transferable mirror image then can be applied to a T-shirt or other article by heat transfer.

The creation of personalized, creative designs or images on a fabric such as a T-shirt or the like through the use of a personal computer system has been described. The method involves electronically generating an image; electronically transferring the image to a printer; printing the image with the aid of the printer on an obverse surface of a transfer sheet which has a final or top coating consisting essentially of Singapore Dammar Resin; positioning the obverse face of the transfer sheet against the fabric; and applying energy to the rear of the transfer sheet to transfer the image to the fabric. The transfer sheet can be any commercially available transfer sheet, the heat-transferrable coating of which has been coated with an overcoating of Singapore Dammar Resin. The use of abrasive particles in the Singapore Dammar Resin coating also has been described. The abrasive particles serve to enhance the receptivity of the transfer sheet to various inks and wax-based crayons.

Improved heat transfer papers having an enhanced receptivity for images made by wax-based crayons, thermal printer ribbons, and impact ribbon or dot-matrix printers have been disclosed. For example, a cellulosic base sheet has an image-receptive coating containing from about 15 to about 80 percent of a film-forming binder and from about 85 to about 20 percent by weight of a powdered polymer consisting of particles having diameters from about 2 to about 50 micrometers. The binder typically is a latex. Alternatively, a cellulosic base sheet has an image-receptive coating which typically is formed by melt extrusion or by laminating a film to the base sheet. The surface of the coating or film then is roughened by, for example, passing the coated base sheet through an embossing roll.

Some effort also has been directed at generally improving the transfer of an image-bearing laminate to a substrate. For example, an improved release has been described, in which upon transfer the release splits from a carrier and forms a protective coating over the transferred image. The release is applied as a solution and contains a montan wax, a rosin ester or hydrocarbon resin, a solvent, and ethylene-vinyl acetate copolymer having a low vinyl acetate content. Additional effort has been directed to improving the adhesion of the transferred laminate to porous, semi-porous, or nonporous materials, and the development of a conformable transfer layer which enables the melt transfer web to be used to transfer print uneven surfaces.

Finally, it may be noted that there are a large number of references which relate to thermal transfer papers. Most of them relate to materials containing or otherwise involving a dye and/or a dye transfer layer, a technology which is quite different from that of the present invention.

Dye diffusion thermal transfer printing is a relatively new technology in which images are formed on a substrate by selectively heating a dye-containing ribbon adjacent to the substrate. A separate heating step is required for each color to be used in forming the image. Moreover, the process is the only one which is capable of forming a photographic quality image.

Dye diffusion thermal transfer printing is a growing technology. For example, customer-operated booths for preparing enlargements of photographs are based on dye diffusion thermal transfer printing. The availability of a dye diffusion printable heat transfer paper would allow consumers to transfer enlargements of their own photographs to T-shirts and other fabrics. Consequently, there is an opportunity for an improved heat transfer material which has been developed specifically for images formed by dye diffusion thermal transfer printing, i.e., a dye diffusion thermal transfer printable heat transfer material.

In spite of the improvements in heat transfer papers, there is no paper which receives graphics or images produced by dye diffusion thermal transfer printing which also is capable of satisfactorily transferring the images to, for example, a fabric. Moreover, papers currently used for dye diffusion printing are complex and expensive. They generally consist of a paper base sheet having one or more synthetic film layers or coatings on both sides.

SUMMARY OF THE INVENTION

The present invention addresses some of the difficulties and problems discussed above by providing a printable material which is especially suitable for use as a dye diffusion thermal transfer printable heat transfer material. In addition, it was discovered that, through the use of the printable material of the present invention, dye diffusion thermal transfer printing generally results in colors which stay brighter during the heat transfer process, compared with, e.g., thermal wax ribbon printed images.

The heat printable material of the present invention includes a first layer having first and second surfaces and a second layer overlaying the first surface of the first layer. By way of example, the first layer may be a film or a nonwoven web. The second layer is composed of a first thermoplastic polymer having a melt flow rate of at least about 15 g/10 minutes at a temperature of 190° C. and a load of 2.16 kg. A third layer overlays the second layer. The third layer is composed of a second thermoplastic polymer having a glass transition temperature equal to or greater than about 30° C. The third layer may include from about 1 to about 40 parts by weight, per 100 parts by weight of the second thermoplastic polymer, of a release agent which is a metal salt of a fatty acid.

The first layer desirably will have a smoothness value no greater than about 150 cc/minute, as determined by a Sheffield Smoothness Tester. For example, the first layer may be a cellulosic nonwoven web, such as a paper or a polymer-reinforced paper. When the first layer has a smoothness value no greater than about 150 cc/minute, the second layer desirably will have a smoothness value no greater than about 100 cc/minute.

In some embodiments, the third layer will have an affinity for diffusion dyes. For example, the third layer also may contain up to about 150 parts by weight, per 100 parts by weight of the second thermoplastic polymer, of a plasticizer. By way of illustration only, the plasticizer may be a phthalate or a dibenzoate plasticizer. As another example, the third layer may also contain up to about 100 parts by weight, again per 100 parts by weight of the second thermoplastic polymer, of a polymeric adhesion-transfer aid. Additionally by way of illustration only, the adhesion-transfer aid may be an ethylene-acrylic acid copolymer or an ethylene-vinyl acetate copolymer.

If desired, a fourth layer may overlay the second surface of the first layer. Such a layer often is referred to in the papermaking art as a backsize layer. Moreover, a fifth layer may be present between the first surface of the first layer and the second layer. An example of such a layer is what is known in the papermaking art as a barrier layer.

DETAILED DESCRIPTION OF THE INVENTION

As used herein, the term "nonwoven web" is meant to include any nonwoven web, including those prepared by such melt-extrusion processes as meltblowing, coforming, and spunbonding. The term also includes nonwoven webs prepared by air laying or wet laying relatively short fibers to form a web or sheet. Thus, the term includes nonwoven webs prepared from a papermaking furnish. Such furnish may include only cellulose fibers, a mixture of cellulose fibers and synthetic fibers, or only synthetic fibers. When the furnish contains only cellulose fibers or a mixture of cellulose fibers and synthetic fibers, the resulting web is referred to herein as a "cellulosic nonwoven web." Of course, the paper also may contain additives and other materials, such as fillers, e.g., clay and titanium dioxide, as is well known in the papermaking art.

As used herein, the term "first thermoplastic polymer" refers to a polymer which softens when exposed to heat and returns to its original condition when cooled to ambient temperature (i.e., about 20°–25° C.), and which has a melt flow rate of at least about 15 g/10 minutes at a temperature of 190° C. and a load of 2.16 kg. Examples of first thermoplastic polymers include, by way of illustration only, end-capped polyacetals, such as poly(oxymethylene) or polyformaldehyde, poly(trichloroacetaldehyde), poly(n-valeraldehyde), poly-(acetaldehyde), poly (propionaldehyde), and the like; acrylic polymers, such as polyacrylamide, poly(acrylic acid), poly(methacrylic acid), poly(ethyl acrylate), poly(methyl methacrylate), polyacrylonitrile, and the like; fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), poly(vinyl fluoride), and the like; polyamides, such as poly(6-aminocaproic acid) or poly(ε-caprolactam), poly-(hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy-1, 4-phenylene-isopropylidene-1,4-phenylene), poly-(sulfonyl-1, 4-phenyleneoxy-1,4-phenylenesulfonyl-4,4'-biphenylene), and the like; polycarbonates, such as poly-(bisphenol A) or poly(carbonyldioxy-1,4-phenyleneisopropylidene-1,4-phenylene), and the like; polyesters, such as poly(ethylene terephthalate), poly (tetramethylene terephthalate), poly(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly (thio-1,4-phenylene), and the like; polyimides, such as poly (pyromellitimido-1,4-phenylene), and the like; polyolefins, such as polyethylene, polypropylene, poly(1-butene), poly (2-butene), poly(1-pentene), poly(2-pentene), poly(3-methyl-1-pentene), poly(4-methyl-1-pentene), and the like; vinyl polymers, such as poly(vinyl acetate), poly(vinylidene chloride), poly(vinyl chloride), and the like; diene polymers, such as 1,2-poly-1,3-butadiene, 1,4-poly-1,3-butadiene, polyisoprene, polychloroprene, and the like; polystyrenes; copolymers of the foregoing, such as acrylonitrile-butadiene-styrene (ABS) copolymers, and the like; and the like.

As used herein, the term "second thermoplastic polymer" refers to a polymer which softens when exposed to heat and returns to its original condition when cooled to ambient temperature, and which has a glass transition temperature of at least about 30° C. Examples of second thermoplastic polymers include, by way of illustration only, vinyl chloride-containing polymers, vinylidene chloride polymers and copolymers, polyacrylates, and polymethacrylates.

Both the first thermoplastic polymer and the second thermoplastic polymer are intended to encompass both homopolymers and copolymers. Copolymers may be random, block, graft, or alternating polymers of two or more monomers.

Additionally, the term "poly(vinyl chloride)" is used herein to include homopolymers and copolymers. Copolymers can be random, block, graft, or alternating polymers of two or more monomers, at least one of which is vinyl chloride. Examples of the more common copolymers include copolymers of vinyl chloride with one or more of vinyl acetate, acrylonitrile, ethylene, propylene, and the like.

The term "poly(vinyl chloride)" also encompasses blends of a poly(vinyl chloride) with one or more other polymers. Polymers suitable for the preparation of such blends include, among others, acrylonitrile-butadiene-styrene copolymers, poly(ε-caprolactone), ethylene-vinyl acetate copolymers, chlorinated ethylene-vinyl acetate copolymers, chlorinated poly(vinyl chloride), polyurethanes, ethylene-vinyl acetate copolymers with carbon monoxide or sulfur dioxide, styrene-acrylonitrile copolymers, nitrile-butadiene rubbers, vinyl chloride-vinyl acetate copolymers, polyesters, and the like.

The second thermoplastic polymer, e.g., a poly(vinyl chloride), may include one or more primary heat stabilizers which serve to prevent or reduce discoloration during melt processing. In general, a suitable primary heat stabilizer should be a hydrogen chloride scavenger, react with free radicals, react with double bond structures, and serve as an antioxidant. If desired, a secondary stabilizer, i.e., a compound which is ineffective when not used in combination with a primary stabilizer, also may be present.

Examples of suitable primary stabilizers include, by way of illustration only, lead compounds, such as dibasic lead phosphate, dibasic lead stearate, lead sulfate, lead chlorosilicate, dibasic lead phthalate, and the like; organotin compounds, such as dibutyltin maleate, dibutyltin dilaurate, di(n-octyl)tin maleate polymer, and the like; tin mercaptides, such as dibutyltin lauryl mercaptide, dibutyltin isooctyl thioglycollate, dibutyltin mercatopropionate, di(n-octyl) tin-S,S'-bis(isooctylmercaptoacetate), and the like; barium-cadmium-zinc compounds, such as barium 2-ethylhexoate, barium nonylphenate, cadmium 2-ethylhexoate, barium, cadmium and zinc laurates and stearates, and the like; calcium-zinc compounds, such as calcium and zinc stearates, and the like; polyols and nitrogen compounds, such as pentaerythritol, sorbitol, melamine, benzoguanamine, dicyandiamide, and the like; and the like.

Suitable secondary stabilizers, include, among others, epoxies, such as epoxidized soya oil, epoxidized linseed oil, epoxidized tall oil esters, butyl and octyl epoxy stearate, and the like; phosphites, such as diphenyldecyl phosphite, phenyldidecyl phosphite, tris(nonylphenyl) phosphite, and the like; and the like.

The desired primary stabilizers are organotin compounds and calcium and zinc compounds. The most desired compounds are dioctyltin maleate and calcium and zinc stearates. Epoxidized soybean oil works well as a secondary stabilizer with calcium and zinc stearates.

Other additives may be employed, if desired. Such other additives include, by way of illustration only, processing aids, such as acrylics, certain ABS resins, chlorinated polyethylene, and the like; impact modifiers, such as acrylic copolymers, ABS resins, chlorinated polyethylene, ethylene-vinyl acetate copolymers, fumaric ester copolymers, various graft copolymers, and the like; lubricants, such as stearic acid and metal stearates, petroleum-based waxes, mineral and vegetable oils, low molecular weight polyethylene, amide and ester waxes, silicone oils, and the like; light stabilizers, such as benzophenones, benzotriazoles, salicylates, substituted acrylonitriles, monobenzoates, and the like; fungicides; brighteners; antioxidants; and the like.

The term "release agent" is used herein to mean a metal salt of a fatty acid. As used herein, the term "metal" is meant to broadly include any metal, e.g., any element of Groups I, II, IVa, Va, VIa, VIIa, VIII, Ib, IIb, IIIb, and IVb. Desirably, the metal will be a metal from Group I or Group II, i.e., an alkali metal or an alkaline-earth metal. The term "fatty acid" is used herein to mean an aliphatic carboxylic acid having at least four carbon atoms. The carboxylic acid may be saturated or unsaturated and may have two or more carboxylic acid groups per molecule. Desirably, the fatty acid will be a saturated monocarboxylic acid having from about 12 to about 24 carbon atoms. For example, the release agent may be a divalent metal salt of a fatty acid, such as calcium stearate.

The term "melt flow rate" is used herein to mean a melt flow rate as determined in accordance with ASTM Method D 1238-82, Standard Test Method for Flow Rates of Thermoplastics by Extrusion Plastometer, using a Model VE 4-78 Extrusion Plastometer (Tinius Olsen Testing Machine Company, Willow Grove, Pa.) having an orifice diameter of 2.0955±0.0051 mm; unless specified otherwise, test conditions were at a temperature of 190° C. and a load of 2.16 kg.

As used herein, the term "plasticizer" is meant to include any material which softens the high glass transition temperature polymer (i.e., the second thermoplastic polymer) of which the third layer is composed. Examples of suitable classes of plasticizers include, by way of illustration only, phthalates, phosphates, adipates, azelates, sebacates, epoxidized esters, trimellitates, benzoates, citrates, isophthalates, pentaerythritol esters, glycolates, ricinoleates, oleates, stearates, terephthalates, polyesters and other polymeric materials, and the like.

Examples of specific plasticizers include, among others, dimethyl phthalate, diethyl phthalate, di(2-methoxyethyl) phthalate, diisobutyl phthalate, dibutyl phthalate, dihexyl phthalate, dicyclohexyl phthalate, diisohexyl phthalate, butyl benzyl phthalate, butyl octyl phthalate, butyl decyl phthalate, diisooctyl phthalate, di-2-ethylhexyl phthalate, dicapryl phthalate, diisodecyl phthalate, isooctyl isodecyl phthalate, n-hexyl-n-decyl phthalate, n-octyl-n-decyl phthalate, isodecyl tridecyl phthalate, ditridecyl phthalate, dibutoxyethyl phthalate, di-2-ethylhexyl isophthalate, acetyl tributyl citrate, dimethyl sebacate, dibutyl sebacate, diisooctyl sebacate, di(2-ethylhexyl) sebacate, diisobutyl adipate, di[2-(2 -butoxyethoxy)ethyl] adipate, diisooctyl adipate, di(2-ethylhexyl) adipate, dinonyl adipate, diisodecyl adipate, dibutoxyethyl adipate, isooctyl isodecyl adipate, n-hexyl-n-decyl adipate, n-octyl-n-decyl adipate, diethylene glycol dibenzoate, trisooctyl trimellitate, tri-2-ethylhexyl trimellitate, epoxidized soybean oil, octyl epoxytallate, 2-ethylhexyl epoxytallate, triethylene glycol di(caprylate-caprate), triethylene glycol dicaprate, cresyl diphenyl phosphate, tricresyl phosphate, triphenyl phosphate, glycerol monoricinoleate, isopropyl myristate, butyl oleate, glycerol trioleate, methyl oleate, n-propyl oleate, isopropyl oleate, n-butyl stearate, and the like.

The plasticizer may be a single compound or two or more compounds from the same class or two or more classes. If two or more compounds are used, they independently may be monomeric or polymeric.

The term "adhesion-transfer aid" is used herein to mean any material which aids adhesion of the third layer to the second layer and aids in the flow of an image placed upon the third layer into a fabric or other substrate to which it is desired to transfer the image. For example, the adhesion-transfer aid may be a polymeric material, such as an ethylene-acrylic acid or an ethylene-vinyl acetate copolymer.

The term "smoothness value" is used herein to mean a smoothness value as measured by a Sheffield Smoothness Tester in accordance with TAPPI Test T-538. The Sheffield Smoothness Tester, available from Testing Machines, Inc., Amityville, N.Y., measures the smoothness of a flat surface. Because of the manner in which measurements are made, the smoothness of a surface is inversely proportional to the smoothness value obtained. That is, higher smoothness values indicate less smooth, or rougher, surfaces. Conversely, lower smoothness values indicate smoother, or less rough, surfaces.

As stated earlier, the printable material of the present invention includes a first layer having first and second surfaces, a second layer, and a third layer. For example, the first layer may be selected from the group consisting of films and nonwoven webs. As another example, the first layer may be a nonwoven web. As a further example, the first layer may be a cellulosic nonwoven web. As still another example, the first layer may be a paper. As yet another example, the first layer may be a polymer-reinforced paper.

The first layer desirably will have a smoothness value no greater than about 150 cc/minute, as determined by a Sheffield Smoothness Tester. Moreover, the first layer should not soften or change dimensions when heated, as thermal dye diffusion processes typically require localized temperatures of about 150° C. or higher.

The second layer overlays the first surface of the first layer and is composed of a first thermoplastic polymer having a melt flow rate of at least about 15 g/10 minutes at a temperature of 190° C. and a load of 2.16 kg. For example, the melt flow rate may be in a range of from about 15 to about 5,000 g/10 minutes at a temperature of 190° C. and a load of 2.16 kg. As another example, the melt flow rate may be in a range of from about 30 to about 2,500 g/10 minutes at a temperature of 190° C. and a load of 2.16 kg. Desirably, the second layer will have a smoothness value no greater than about 100 cc/minute, as determined by a Sheffield Smoothness Tester, when the first layer has a smoothness value of less than about 150 cc/minute.

The first thermoplastic polymer desirably will be an ethylene homopolymer or copolymer or a polyamide. For example, the first thermoplastic polymer may be polyethylene, ethylene-vinyl acetate copolymers, ethylene-acrylic acid copolymers, ethylene-methacrylic acid, poly [imino(1-oxododecamethylene)] or nylon 12, and imino(1-oxohexamethylene)-imino (1-oxododecamethylene) copolymers or nylon 6–12 copolymers.

The second layer typically is formed on the first surface of the first layer by melt extrusion, in accordance with well known techniques. For convenience, the combination of first and second layers is referred to in the examples as the "base sheet."

The third layer overlays the second layer and is composed of a second thermoplastic polymer having a glass transition temperature equal to or greater than about 30° C. The third layer may include a release agent which is a metal salt of a fatty acid. The release agent in general may be present in an amount of from about 1 to about 40 parts by weight, per 100 parts by weight of the second thermoplastic polymer. The release agent desirably will be present in an amount of from about 5 to about 30 parts by weight, per 100 parts by weight of the second thermoplastic polymer.

The third layer may include up to about 150 parts by weight of a plasticizer, per 100 parts by weight of the second thermoplastic polymer. When used, the plasticizer desirably will be present in an amount of from about 25 to about 125 parts by weight. More desirably, the plasticizer will be present in an amount of from about 50 to about 100 parts by weight, per 100 parts by weight of the second thermoplastic polymer. Particularly useful plasticizers include the phthalates, such as butyl benzyl phthalate and dicyclohexyl phthalate, and the dibenzoates, such as diethylene glycol dibenzoate.

The third layer also may include up to about 100 parts by weight of an adhesion-transfer aid, per 100 parts by weight of the second thermoplastic polymer. For example, the adhesion-transfer aid may be present in an amount of from about 10 to about 70 parts by weight, per 100 parts by weight of the second thermoplastic polymer. As another example, the adhesion-transfer aid may be present in an amount of from about 30 to about 50 parts by weight, per 100 parts by weight of the second thermoplastic polymer. The adhesion-transfer aid desirably will be an ethylene-acrylic acid copolymer or an ethylene-vinyl acetate copolymer.

The third layer in general is formed over the second coating by known means. For example, the third layer may be formed from a latex, in which case it may be either desirable or necessary to include an emulsifying agent for the plasticizer. Suitable emulsifying agents include ethylene oxide-propylene oxide oligomers, alkylphenol-ethylene oxide condensates, soaps such as ammonium oleate, and detergents such a sodium lauryl sulfate. An emulsifying agent typically will be used in an amount of from about 1 to about 10 percent by weight, based on the weight of the plasticizer.

In some embodiments, a fourth layer may be present; such layer will overlay the second surface of the first layer. The layer, in effect, is a backsize coating. The fourth layer generally consists essentially of a binder and clay. For example, the binder may be a polyacrylate, such as Rhoplex HA-16 (Rohm and Haas Company, Philadelphia, Pa.). As another example, the clay may be Ultrawhite 90 (Englehard, Charlotte, N.C.). A typical formulation would include the two materials in amounts of 579.7 parts by weight and 228.6 parts by weight, respectively. Water and/or a thickening agent will be added as necessary to give a final dispersion viscosity in the range of 0.100–0.140 Pa s (100–140 centipoise) at ambient temperature.

In addition to or in place of the fourth layer, a fifth layer may be present. The fifth layer usually will be located between the first and second layers. The fifth layer typically will be formed from a dispersion consisting of, by way of example only, 208 parts by weight of Hycar® 26084 (B. F. Goodrich Company, Cleveland, Ohio), a polyacrylate dispersion having a solids content of 50 percent by weight (104 parts dry weight), 580 parts by weight of a clay dispersion having a solids content of 69 percent by weight (400 parts dry weight), and 100 parts by weight of water. Additional water and/or a thickening agent may be added as necessary to give a final dispersion viscosity in the range of 0.100–0.140 Pa s (100–140 centipoise) at ambient temperature.

The present invention is further described by the examples which follow. Such examples, however, are not to be construed as limiting in any way either the spirit or the scope of the present invention. Whenever possible, units of measurement will be expressed as SI units (International System of Units), whether Basic or Derived. Unless indicated otherwise, all parts are by weight and all basis weights are on a dry-weight basis. When the drying of a layer or coating is specified in an example, a Model 28 Precision Scientific Electric Drying Oven was used.

EXAMPLES

A number of different first layers, second thermoplastic polymers, release agents, and other constituents were employed in the examples. For convenience, all of these materials are described first.
Base Sheets
BS-A The first layer was a commercially available label paper, Repap® 9365 (Repap Corporation, Kimberly, Wis.). The paper had a basis weight of 88 grams per square meter (gsm), a Sheffield smoothness value of about 110 cc/minute, and a print coating on one side. Unless stated otherwise, the side of the paper having the print coating was the second surface and the side of the paper having no coating was the first surface. The first surface was extrusion coated with a copolymer of ethylene and methacrylic acid to give the base sheet identified as BS-A. The copolymer was Nucrel® 599, a copolymer of ethylene and methacrylic acid available from E. I. DuPont de Nemours and Company, Wilmington, Del., is reported to have a melt flow rate of 500 g/10 minutes. The second layer had a thickness of about 1.8 mils (about 46 micrometers).

BS-B

The first layer also was the Repap® 9365 paper just described. In this case, the first surface was coated with coextruded layers of Elvax® 410 and Nucrel® 599. The Elvax® 410 layer was adjacent to the paper and the Nucrel® 599 layer overlayed the Elvax® 410 layer. The Elvax 410® layer was about 25 micrometers thick, and the Nucrel® 599 layer was about 12 micrometers thick. Elvax® 410 is an ethylene-vinyl acetate copolymer available from E. I. DuPont de Nemours and Company and is reported to have a melt flow rate of 500 g/10 minutes. The copolymer contains 18 percent polymerized vinyl acetate.

Second Thermoplastic Polymers (2nd Polymer)

2P-A: a polyurethane, Sancot® 12676 (Sanncor Industries, Leomaster, Mass.).

2P-B: a polyurethane, Sancor® 815 (Sanncor Industries).

2P-C: a polyacrylate, Rhoplex® E1018 (Rohm and Haas Company, Philadelphia, Pa.).

2P-D: a styrene-maleic anhydride copolymer, Scripset® 540 (Monsanto, St. Louis, Mo.), dissolved with aqueous ammonium hydroxide to 10 percent by weight solids.

2P-E: a hollow sphere pigment, Ropaque® OP84, from Rohm and Haas Company.

2P-F: a polyurethane emulsion, Sancor® 776 (Sanncor Industries).

2P-G: an ethylene-vinyl acetate latex, Airflex® 140 (Air Products and Chemicals, Inc., Allentown, Pa.).

2P-H: an ethylene-vinyl chloride latex, Airflex® 4500 (Air Products and Chemicals, Inc.).

2P-I: a polyvinyl acetate, Reichhold® 97-907 (Reichhold Chemicals, Inc., White Plains, N.Y.).

2P-J: an epoxy resin based on bisphenol A and epichlorohydrin, Epon® 828 (Shell Chemical Company, Houston, Tex.).

2P-K: an ethylene-acrylic acid dispersion, Michem® Prime (Michelman, Inc., Cincinnati, Ohio). The material was a 25 percent solids dispersion of Primacot® 5983 made by Dow Chemical Company, Midland, Mich., a copolymer containing percent acrylic acid and 80 percent ethylene. The copolymer had a Vicat softening point of 43° C. and a ring and ball softening point of 100° C. The melt flow rate of the copolymer was 500 g/10 minutes.

2P-L: a polystyrene, BN4901X (BASF America Corporation, Parsippany, N.J.).

2P-M: a hard polyacrylate, Rhoplex® E2321 (Rohm and Haas Company).

2P-N: a hard polyacrylate, Rhoplex® B-85 (Rohm and Haas Company).

2P-O: a styrene-acrylonitrile copolymer latex, Darex® (W. R. Grace, Organic Chemicals Division, Lexington, Mass.).

2P-Q: a polyacrylate, Hycar® 26288 (B. F. Goodrich Company, Cleveland, Ohio).

2P-R: a plasticized poly(vinyl chloride) latex, Geon® (B. F. Goodrich Company).

2P-S: an ethylene-vinyl acetate pressure-sensitive adhesive latex, Flexbond® 150 (Air Products and Chemicals, Inc.).

2P-T: a poly(vinyl acetate), Polyco® 2144 (Borden, Inc., Borden Chemical Division, Columbus, Ohio).

2P-U: a poly(vinyl acetate), Plyamul® 40305 (Reichhold Chemicals, Inc.).

2P-V: a poly(vinyl acetate), Airflex® ASB 516 (Air Products and Chemicals, Inc.).

2P-W: a poly(vinyl chloride) latex, Geon® 352 (B. F. Goodrich Company).

Release Agents

RA-A: an amide wax, Acrawax® C (Glyco Chemical Company, Greenwich, Conn.).

RA-B: Calcium stearate, Nopcote® C-104 (Henkle Corporation, Ambler, Pa.).

RA-C: a paraffin wax emulsion, Chemawax® 40 (Chematron, Inc., Charlotte, N.C.).

RA-D: Stearic acid.

RA-E: Glycerol monostearate, Myverol® 18-07 (Eastman Chemical Company, Kingsport, Tenn.).

RA-F: a mixture of sodium cetyl sulfate and sodium stearyl sulfate, Sipex® EC111 (Alcolac, Baltimore, Md.).

RA-G: melamine stearate, Sunsize® 137 (Sun Chemical Corporation, New York, N.Y.).

RA-H: a silicone, SM 2112 (General Electric Company, Silicon Products Division, Waterford, N.Y.).

RA-I: an anionic surfactant, Milsoft® CT (I.C.I. United States, Inc., Wilmington, Del.).

RA-J: ammonium lauryl sulfate, Sipon® L 22 (Alcolac).

Other Constituents

O-A: a multifunctional aziridine, XAMA-7® (Sanncor Industries, Leomaster, Mass.), a crosslinking agent.

O-B: a polyethoxylated alkylphenol, Triton® X-100 (Union Carbide Corporation, Danbury, Conn.), a surfactant.

O-C: a high density polyethylene wax, Micropowders® MPP VF (Micropowders, Inc., Tarrytown, N.Y.).

Plasticizers

PL-A: an epoxyresin based on bisphenol A and epichlorohydrin, Epon® 828 (Shell Chemical Company).

PL-B: triaryl phosphate, Kronitex® 100 (FMC Corporation, Philadelphia, Pa.).

PL-C: tri(butoxyethyl) phosphate (Rhone-Poulenc, Cranbury, N.J.).

PL-D: a polyamide, Versamide® 105 (Henkle Corporation).

PL-E: a high molecular weight polyester, Paraplex® G-40 (C. P. Hall, Chicago, Ill.).

PL-F: an epoxidized soya oil, Paraplex® G-62 (C. P. Hall).

PL-G: a self-emulsifying mixture of esters used as a dye bath additive to carry dyes in fabric dyeing, Polydyol® H2V5 (Eastern Color and Chemical Corporation, Providence, R.I.).

PL-H: a low molecular weight polyester, Paraplex® G-31 (C. P. Hall).

PL-I: an epoxidized octyl tallate, Monplex® S-73 (C. P. Hall).

PL-J: cetyl stearate, Kemester® S721 (Witco Corporation, Newark, N.J.).

PL-K: stearyl benzoate, Finsolv® 116 (Finetex, Inc., Elmwood Park, N.J.).

PL-L: ammonium stearate, Nopcote® DC 100A (Henkle Corporation).

PL-M: dipropylene glycol dibenzoate, Benzoflex® 9-88 (Velsicol Chemical Corporation, Rosemont, Ill.).

PL-N: butyl benzyl phthalate, Santicizer® 160 (Monsanto).

PL-O: alkyl diphenyl phosphate, Santicizer® 148 (Monsanto).

PL-P: Santicizer® 278 (Monsanto).

PL-Q: a high molecular weight epoxy resin dispersion, Shell® 3540 W4-55 (Shell Chemical Company).

PL-R: trioctyl trimellitate, Aristech® PX338 (Aristech Chemical Corporation, Pittsburgh, Pa.).

PL-S: cumylphenyl acetate, Kenplast® ES 2HP (Kenrich Petrochemicals, Bayonne, N.J.).

PL-T: dicyclohexyl phthalate, Umimoll® 66 (Mobay Chemical Company, Pittsburgh, Pa.).

EXAMPLE 1

A number of trials were carried out with the base sheet, BS-A. The third layer typically was formed from an emulsion or dispersion. The emulsification of plasticizers is illustrative of the procedure employed. By way of illustration, 100 g of PL-N (Santicizer® 160) was mixed with 5 g of O-B (Triton® X-100). Water, 100 g, then was added with rapid stirring using a Caframo laboratory mixer (Caframo, Wiarton, Ontario, Canada) to give a coarse emulsion. The coarse emulsion then was homogenized using a Tri-Homo colloid mill at a 1-mil setting (Tri-Homo Division of Sonic Corporation, Stratford, Conn.). As another illustration, 100 g of PL-T (Umimoll® 66) was dispersed in 125 g of water containing 5 g of O-B (Triton® X-100) using a Caframo laboratory mixer, followed by homogenization in a Tri-Homo colloid mill as just described.

After mixing all desired ingredients, an excess of the formulated coating was poured over the second layer of the base sheet and spread evenly over the surface by means of a Meyer rod; for example, a number 12 Meyer rod resulted in a third layer basis weight of about 9 gsm after curing or drying. The paper then was cured in a forced air oven at 90° C. for two minutes. The third layer varied as shown in Table 1; in the table, all basis weights are given in gsm.

TABLE 1

Summary of Third Layer Compositions

| Trial | Basis Weight | 2nd Polymer ID | 2nd Polymer Parts | Release Agent ID | Release Agent Parts | Other ID | Other Parts |
|---|---|---|---|---|---|---|---|
| 1-A | 9.4 | 2P-A | 100 | — | — | O-A | 5 |
| 1-B | 9.4 | 2P-B | 100 | — | — | O-A | 5 |
| 1-C | 9.4 | 2P-C | 100 | — | — | — | — |
| 1-D | 9.4 | 2P-C | 100 | — | — | O-A | 5 |
| 1-E | 13 | 2P-C | 100 | — | — | O-A | 5 |
| 1-F | 5.6 | 2P-D | 100 | — | — | — | — |
| 1-G | 9.4 | 2P-E | 100 | — | — | — | — |
| 1-H | 9.4 | 2P-F | 100 | — | — | — | — |
| 1-I | 9.4 | 2P-F | 100 | RA-A | 20 | — | — |
| 1-J | 9.4 | 2P-F | 100 | RA-B | 10 | — | — |
| 1-K | 9.4 | 2P-F | 100 | RA-C | 20 | — | — |
| 1-L | 9.4 | 2P-F | 100 | RA-D | 10 | — | — |
| 1-M | 9.4 | 2P-F | 100 | RA-E | 10 | — | — |
| 1-N | 9.4 | 2P-F | 100 | RA-F | 10 | — | — |
| 1-O | 9.4 | 2P-G | 100 | RA-F | 10 | — | — |
| 1-P | 9.4 | 2P-H | 100 | RA-F | 10 | — | — |
| 1-Q | 11.3 | 2P-I | 100 | — | — | — | — |
| 1-R | 2 | — | — | RA-E | 100 | O-B | 5 |
|     |   |   |   | RA-F | 10 |   |   |

In trial 1-R, the third layer was formed from a 2 percent by weight solids content dispersion of RA-E (Myverol® 18-07) which was dispersed with 10 parts of RA-F (Sipex® EC111) and parts of O-B (Triton® X-100) per 100 parts by dry weight of RA-E. It may be noted that the third layer in trial 1-R does not come within the scope of the claims. However, the third layer was not satisfactory, as noted in Table 2.

Dye diffusion thermal transfer printing generally was accomplished with a Seiko Professional Color Point II printer. Printing utilized a bar pattern having cyan, magenta, grey, green, and red bars. The image transfer procedure consisted of placing a printed paper image-side down on a 100 percent cotton T-shirt fabric sample. The resulting combination was heat-pressed for 30 seconds at 177° C. in a Model S-600 heat transfer press (Hix Corporation, Pittsburgh, Kans.). The paper was removed before the fabric sample cooled. Printing and image transfer results are summarized in Table 2.

TABLE 2

Summary of Printing and Transfer Results

| Trial | Printing and Transfer Results |
|---|---|
| 1-A | Fair print, image failed to transfer |
| 1-B | Poor print, image failed to transfer |
| 1-C | Poor print, transfer not attempted |
| 1-D | Fair print, transfer not attempted |
| 1-E | Fair print, transfer not attempted |
| 1-F | Almost colorless print, transfer not attempted |
| 1-G | Very light print, transfer not attempted |
| 1-H | Ribbon stuck to third layer, transfer not attempted |
| 1-I | Ribbon stuck to third layer, transfer not attempted |
| 1-J | Ribbon stuck to third layer, transfer not attempted |
| 1-K | Ribbon stuck to third layer, transfer not attempted |
| 1-L | Ribbon stuck to third layer, transfer not attempted |
| 1-M | Ribbon stuck to third layer, transfer not attempted |
| 1-N | Ribbon stuck to third layer, transfer not attempted |
| 1-O | Ribbon stuck to third layer, transfer not attempted |
| 1-P | Ribbon stuck to third layer, transfer not attempted |
| 1-Q | Very light print, transfer not attempted |
| 1-R | Fair print, excellent image transfer* |

*On standing after printing, but before transfering, the image became fuzzy (dye diffused laterally in the third layer).

None of the above trials resulted in a printable medium suitable for the intended application as a heat transfer paper. The crosslinker O-A (XAMA-7®) employed in trials 1-A, 1-B, 1-C, and 1-D was needed to prevent ribbon sticking. However, the material prevented transfer since it made the coating (i.e., the third layer) infusible. Also, printing (i.e., image formation on the third layer) was poor in most cases.

EXAMPLE 2

The procedure of Example 1 was repeated a number of times, except that in each case the third layer contained O-C (a powdered polyethylene, MPP635VF) and the second polymer, or binder, was 2P-K (Michem® Prime 4983). In addition, the transferred images were washed in warm water and rinsed in cold water in a standard commercially available washing machine using one cup of Tide® detergent.

The compositions of the several third layers are summarized in Table 3 and the printing, image transfer, and washability results are summarized in Table 4. In each instance, the basis weight of the third layer was about 8 gsm. In Table 3, all parts are parts by weight, based on the total weight of the dispersion used to form the third layer.

TABLE 3

Summary of Third Layer Compositions

| Trial | Parts Binder | Other 2nd Polymer ID | Parts | Release Agent ID | Parts | Other ID | Parts |
|---|---|---|---|---|---|---|---|
| 2-A | 30 | — | — | RA-F | 8 | O-C | 100 |
| 2-B | 23 | 2P-J | 23 | RA-F | 5 | O-C | 100 |
| 2-C | 23 | — | — | RA-F | 5 | O-C | 100 |
|     |    |     |    | RA-E | 23 | O-C | 100 |
| 2-D | 23 | 2P-F | 23 | RA-F | 5 | O-C | 100 |
| 2-E | 23 | 2P-G | 23 | RA-F | 5 | O-C | 100 |
| 2-F | 19 | 2P-F | 39 | RA-F | 4 | O-C | 100 |
| 2-G | 19 | — | — | RA-F | 4 | O-C | 100 |
|     |    |     |    | RA-E | 39 |     |     |

TABLE 4

Summary of Printing and Transfer Results

| Trial | Printing and Transfer Results |
|---|---|
| 2-A | Very light print, image transferred |
| 2-B | Print color a little light, good transfer and washability |
| 2-C | Print color light, good transfer and fair washability |
| 2-D | Print color light, good transfer and washability |
| 2-E | Print color light, difficult to transfer, but good washability |
| 2-F | Ribbon stuck to third layer |
| 2-G | Dark print which was too blue and too red |

The foregoing trials demonstrated good transferability which resulted from the absence in the coating of cross-linked or high-melting materials, with ribbon sticking being prevented by the addition of a soap to the coating formulation. However, images formed on the coatings were somewhat lacking in print density because of the non-polar character of the binder and powdered polyethylene employed.

EXAMPLE 3

The procedure of Example 1 was repeated to evaluate combinations of second thermoplastic polymers with both base sheets. In each case, the third layer contained 10 parts of release agent RA-B (calcium stearate, Nopcote® C-104) and 50 parts of the second thermoplastic polymer 2P-K (Michem® Prime 4983). The compositions of the several third layers are summarized in Table 5 and the printing, image transfer, and washability results are summarized in Table 6.

TABLE 5

Summary of Third Layer Compositions
(All Contain 50 Parts 2P-K and 10 Parts RA-B)

| Trial | Base Sheet | Other 2nd Polymer ID | Parts | Other Ingredient[a] ID | Parts |
|---|---|---|---|---|---|
| 3-A | BS-B | 2P-L | 100 | — | — |
| 3-B | BS-B | 2P-L | 100 | 2P-J | 50 |
| 3-C | BS-B | 2P-L | 100 | 2P-J | 100 |
| 3-D | BS-B | 2P-M | 100 | — | — |
| 3-E | BS-B | 2P-M | 100 | 2P-J | 50 |
| 3-F | BS-B | 2P-M | 100 | 2P-J | 100 |
| 3-G | BS-B | 2P-N | 100 | — | — |
| 3-H | BS-B | 2P-O | 100 | — | — |
| 3-I | BS-B | 2P-P | 100 | — | — |
| 3-J | BS-A | 2P-P | 100 | — | — |
| 3-K | BS-B | 2P-Q | 100 | — | — |
| 3-L | BS-B | 2P-L | 100 | 2P-J | 50 |
| 3-M | BS-B | 2P-R | 100 | — | — |
| 3-N | BS-B | 2P-R | 100 | 2P-J | 50 |
| 3-O[b] | BS-B | 2P-R | 100 | 2P-S | 50 |
| 3-P | BS-A | 2P-T | 100 | — | — |
| 3-Q | BS-A | 2P-U | 100 | — | — |
| 3-R | BS-A | 2P-V | 100 | — | — |

[a]Included as a plasticizer.
[b]2nd polymer 2P-K was not included.

TABLE 6

Summary of Printing and Transfer Results

| Trial | Printing and Transfer Results |
|---|---|
| 3-A | Very light print, ribbon stuck to third layer |
| 3-B | Darker print, very sticky to ribbon |
| 3-C | Darker print, very sticky to ribbon |
| 3-D | Very light print, very sticky to ribbon |
| 3-E | Darker print, ribbon stuck to third layer |
| 3-F | Darker print, ribbon stuck to third layer |
| 3-G | Very light print, ribbon stuck to third layer |
| 3-H | Very light print, ribbon stuck to third layer |
| 3-I | Very light print, ribbon stuck to third layer |
| 3-J | Very light print, ribbon stuck to third layer |
| 3-K | Ribbon stuck to third layer and broke |
| 3-L | Ribbon stuck to third layer, third layer was removed from second layer |
| 3-M | No sticking of ribbon, print a little light; good washability of transferred image |
| 3-N | Good print |
| 3-O | Good print, good transfer, good washability |
| 3-P | Light print, ribbon stuck to third layer |
| 3-Q | Light print, ribbon stuck to third layer |
| 3-R | Light print, ribbon stuck to third layer |

The Michem® Prime 4983 employed in the above trials functioned as an adhesion aid between the second and third layers and also as a transfer aid. The best results were obtained when the second polymer was a poly(vinyl chloride).

EXAMPLE 4

The procedure of Example 1 was repeated, except that the third layer was composed of 100 parts of 2P-W (Geon® 352), 50 parts of 2P-K (Michem® Prime 4983), 10 parts of RA-B (calcium stearate, Nopcote® C-104), and varying amounts of a plasticizer, all parts on a dry weight basis. Both first layers were utilized. The compositions of the various third layers are summarized in Table 7 and the printing, image transfer, and washability results are summarized in Table 8. In each instance, the basis weight of the third layer was about 7.5 gsm. In Table 7, all parts are parts by weight, based on the total weight of the dispersion used to form the third layer.

TABLE 7

Summary of Third Layer Compositions
(All Contain 100 Parts 2P-W,
50 Parts 2P-K, and 10 Parts RA-B)

| Trial | Base Sheet | Plasticizer ID | Parts |
|---|---|---|---|
| 4-A | BS-B | — | — |
| 4-B | BS-B | PL-A | 50 |
| 4-C | BS-B | PL-A | 100 |
| 4-D | BS-B | PL-B | 50 |
| 4-E | BS-B | PL-B | 100 |
| 4-F | BS-A | PL-C | 50 |
| 4-G | BS-A | PL-D | 50 |
| 4-H | BS-A | PL-E | 50 |
| 4-I | BS-A | PL-F | 50 |
| 4-J | BS-A | PL-G | 50 |
| 4-K | BS-A | PL-H | 50 |
| 4-L | BS-A | PL-I | 50 |
| 4-M | BS-A | PL-J | 50 |
| 4-N | BS-A | PL-K | 50 |
| 4-O | BS-A | PL-L | 50 |
| 4-P | BS-B | PL-M | 50 |
| 4-Q | BS-A | PL-N | 50 |
| 4-R | BS-A | PL-N | 100 |
| 4-S | BS-A | PL-O | 50 |
| 4-T | BS-A | PL-O | 100 |
| 4-U | BS-A | PL-P | 50 |
| 4-V | BS-A | PL-P | 100 |
| 4-W | BS-A | PL-Q | 50 |
| 4-X | BS-A | PL-Q | 100 |
| 4-Y | BS-A | PL-R | 50 |
| 4-Z | BS-A | PL-R | 100 |
| 4-AA | BS-A | PL-S | 50 |
| 4-BB | BS-A | PL-S | 100 |

TABLE 8

Summary of Printing and Transfer Results

| Trial | Printing and Transfer Results |
|---|---|
| 4-A | Slightly light print, good washability |
| 4-B | Very good print and washability |
| 4-C | Very good print and washability |
| 4-D | Very good print and washability |
| 4-E | Very good print and washability |
| 4-F | Very good print and washability |
| 4-G | Good print, print discolored when transferred |
| 4-H | Light print, ribbon stuck to third layer |
| 4-I | Slightly light print, some sticking of ribbon to third layer |
| 4-J | Good print |
| 4-K | Good print, ribbon stuck to third layer |
| 4-L | Light print, severe sticking of ribbon to third layer |
| 4-M | Light print, ribbon stuck to third layer |
| 4-N | Light print, ribbon stuck to third layer |
| 4-O | Light print, ribbon stuck to third layer |
| 4-P | Good print, slight sticking of ribbon to third layer |
| 4-Q | Light print, some sticking of ribbon to third layer |
| 4-R | Good print, excellent transfer |
| 4-S | Light print, some sticking of ribbon to third layer |
| 4-T | Light print, some sticking of ribbon to third layer |
| 4-U | Light print, some sticking of ribbon to third layer |
| 4-V | Light print, some sticking of ribbon to third layer |
| 4-W | Light print, ribbon stuck to third layer |
| 4-X | Light print, ribbon stuck to third layer |
| 4-Y | Light print, ribbon stuck to third layer |
| 4-Z | Light print, ribbon stuck to third layer |
| 4-AA | Light print, ribbon stuck to third layer |
| 4-BB | Light print |

In the above trials, it is evident that the combination of poly(vinyl chloride), plasticizer, release aid, and adhesion aid gave good results in many instances. Surprisingly, ribbon sticking was not a problem when lower molecular weight plasticizers were employed, but seemed worse with some higher molecular weight plasticizers.

EXAMPLE 5

The procedure of Example 4 was repeated, except that only BS-A was used, the third layer was composed of 100 parts of 2P-W (Geon® 352), 50 parts of 2P-K (Michem® Prime 4983), 50 parts of 2P-J (Epon® 828), and 10 parts of a release agent. The compositions of the various third layers are summarized in Table 9 and the printing results are summarized in Table 10.

TABLE 9

Summary of Third Layer Compositions
(All Contain 100 Parts 2P-W, 50 Parts 2P-K,
and 50 Parts of 2P-J) and Printing Results

| Trial | Release Agent ID | Parts | Printing Results |
|---|---|---|---|
| 5-A | RA-G | 10 | Severe sticking of ribbon to third layer |
| 5-B | RA-F | 10 | Severe sticking of ribbon to third layer |
| 5-C | RA-E | 10 | Severe sticking of ribbon to third layer |
| 5-D | RA-H | 10 | Severe sticking of ribbon to third layer |
| 5-E | RA-I | 10 | Severe sticking of ribbon to third layer |
| 5-F | RA-J | 10 | Severe sticking of ribbon to third layer |

The release agents studied were not effective, further demonstrating the unusual effectiveness of the metal stearate-poly(vinyl chloride)-plasticizer-transfer aid combination.

EXAMPLE 6

The procedure of Example 2 was repeated with base sheet BS-A and several different third layers to evaluate the effect of variations on the basis weight of the third layer. The third layer in each case was composed of 100 parts of 2P-W (Geon® 352), 50 parts of 2P-J (Epon® 828), 10 parts of RA-B (Nopcote® C-104), and 50 parts of a plasticizer. Three different plasticizers were evaluated at three different third layer basis weights. The three plasticizers were PL-A (Epon® 828), PL-B (Kronitex® 100), and PL-N (Santicizer® 160). The three basis weights studied were about 3.8 gsm, 11.3 gsm, and 15.1 gsm.

With all three plasticizers, the ribbon stuck to the third layer more when the third layer basis weight was lower, but all were acceptable. Transfers were made to 100 percent cotton T-shirt fabric and washed as already described. Samples having the lowest third layer basis weight were lighter in color but washed well. The two higher third layer basis weight samples showed some spotty peeling of transferred images from the fabric after six washes. Thus, the desirable basis weight range for the third layer is from about 3.8 gsm to about 11.3 gsm.

EXAMPLE 7

Samples having third layers composed of 100 parts of 2P-W (Geon® 352), 50 parts of 2P-K (Michem® Prime 4983), 10 parts of RA-B (Nopcote® C-104, calcium stearate), and 50 parts of PL-A (Epon® 828), such as Trial 4-B in Example 4, were found to transfer poorly after aging at ambient temperature for several weeks. Samples of Trial 4-B paper as a control and samples in which the PL-B was replaced by an equal amount of PL-B (Kronitex® 100) or PL-N (Santicizer® 160) were aged in a circulating air oven at 55° C. for three days. The control sample printed well but did not transfer to fabric. The other samples printed and transferred well.

Since none of the plasticizers other than PL-A resulted in prints as good as those resulting from the use of PL-A, the addition of PL-T (dicyclohexyl phthalate, Umimoll® 66) was studied. In each case, the basis weight of the third layer was about 7.5 gsm and the base sheet was BS-A. The compositions of the various third layers are summarized in Table 10 and the printing and image transfer results are summarized in Table 11.

TABLE 11

Summary of Third Layer Compositions
(All Contain 100 Parts 2P-W and 10 Parts RA-B)

| Trial | Other 2nd Polymer ID | Parts | PL-T Parts | Other Plasticizer ID | Parts | Other ID | Parts |
|---|---|---|---|---|---|---|---|
| 7-A | 2P-K | 50 | — | PL-N | 100 | — | — |
| 7-B | 2P-K | 50 | — | PL-B | 100 | — | — |
| 7-C | 2P-K | 50 | — | — | — | — | — |
| 7-D | — | — | 50 | PL-N | 50 | — | — |
| 7-E | — | — | 50 | PL-B | 50 | — | — |
| 7-F | 2P-K | 25 | 50 | PL-N | 50 | O-C | 12.5* |
| 7-G | 2P-K | 35 | 50 | PL-M | 50 | O-C | 12.5* |
| 7-H | 2P-K | 50 | — | PL-M | 50 | — | — |
| 7-I | 2P-K | 50 | — | PL-M | 100 | — | — |

*The powdered polyethylene was included to aid sheet feeding in the printer and to reduce static cling of the paper to the printer's ink ribbon.

As seen in Table 11, two of the trials included a powdered polyethylene in the third layer. The powdered polyethylene was dispersed in water using 5 parts on a dry weight basis of O-B (Triton® X-100). The resulting dispersion contained 40 percent by weight solids and was added to the other components after dispersing in a colloid mill. The PL-T and PL-M also were dispersed by means of the same procedure.

TABLE 12

Summary of Printing and Transfer Results

| Trial | Printing and Transfer Results |
|---|---|
| 7-A | Fair print, ribbon sticks to third layer |
| 7-B | Fair print, ribbon sticks to third layer |
| 7-C | Light print |
| 7-D | Excellent print, marginal coating adhesion to base sheet during transfer |
| 7-E | Excellent print, marginal coating adhesion to base sheet during transfer |
| 7-F | Excellent |
| 7-G | Excellent |
| 7-H | Light print, ribbon sticks to third layer |
| 7-I | Good print, ribbon sticks to third layer |

With trials 7-G, 7-H, and 7-I, it was observed that there was a lack of sufficient shear stability for pilot scale coating. Nine emulsifiers other than Triton® X-100 were investigated, namely: Triton® X-405 (Union Carbide Chemical Company), RA-F or Sipex® EC111, Emulsiter® 65 (Henkel, Ambler, Pa.), ammonium oleate, Aerosol® OT (Cytec, West Patterson, N.J.), Pluronic® F68, Pluronic® P-105, Pluronic® P-123 (all from BASF), and Disponil® 23 (Henkel). All formed fairly stable emulsions but did not improve the stability of the plasticizer/2P-W mixture. Other copolymer lattices were investigated as replacements for the 2P-W; these included Vycar® TN810, Vycar® G-27, and Vycar® TN807. The Vycar® TN810, which has some carboxyl functional groups, gave a stable coating mix with the PL-M emulsions. The others did not, including emulsions made with Triton® X-100, Triton® X-405, ammonium stearate, Pluronic® P-123, and Pluronic® F-68.

While trials 7-F and 7-G came very close to being commercially acceptable, it was noted that the third layer coatings developed a very slight tackiness after several days. Since this could cause problems in sheet feeding or roll handling, increasing the amount of RA-B (calcium stearate, Nopcote® C-104) and decreasing the amount of plasticizer PL-M in the formulation employed in trial 7-G were investigated. Optimum results were obtained with 40 parts by weight of RA-B and 30 parts by weight of PL-M, per 100 parts of second polymer 2P-W, a poly(vinyl chloride).

EXAMPLE 8

Finally, four additional materials were evaluated in accordance with the procedures described in previous examples. These materials are described below.

(1) A water-dispersed polyester, 220–4100, from McWhorter Corporation (Minneapolis, Minn.), was evaluated as a plasticizer in third-layer compositions containing poly(vinyl chloride), plasticizer, release aid, and adhesion aid. The material is referred to herein as plasticizer PL-U.

(2) In addition, a polycaprolactone diol, Tone® 0201 (Union Carbide Corporation, Danbury, Conn.), also was evaluated as a plasticizer in the third-layer compositions described above. The material, referred to herein as plasticizer PL-V, was designed as a polyurethane precursor.

(3) The third material was a poly(vinyl chloride) copolymer latex, Vycar® TN810 (B. F. Goodrich Company). It was given the designation 2P-X and evaluated as a second thermoplastic polymer in the third layer compositions described above.

(4) The fourth, and last, material was a 10-micrometer particle size, porous, nylon 6–12 copolymer, Orgasol® 2301 EXD NAT1 (Elf Atochem). The material was in the "Other"

category and given the designation O-D. It also was evaluated in the third layer compositions described above.

The compositions of the various third layers are summarized in Table 13; in every case base sheet BS-A was employed. The printing and image transfer results are summarized in Table 14.

TABLE 13

Summary of Third Layer Compositions

| | 2nd Polymers | | | | Plasticizer | | |
|---|---|---|---|---|---|---|---|
| | Parts | Parts | Parts | Parts | | Parts | Parts |
| Trial | 2P-K | 2P-W | 2P-X | RA-B | ID | Parts | O-D |
| 8-A | 50 | 100 | — | 25 | PL-U | 62.5 | — |
| 8-B | — | 100 | — | 25 | PL-U | 100 | — |
| 8-C | 50 | 100 | — | 25 | PL-U | 75 | |
| 8-D | 40 | 100 | — | 25 | PL-T | 70 | — |
| | | | | | PL-M | 35 | |
| 8-E | 30 | — | 100 | 40 | PL-T | 60 | — |
| | | | | | PL-M | 30 | |
| 8-F | 40 | 100 | — | 25 | PL-M | 35 | 70 |
| 8-G | 50 | 100 | — | 25 | PL-M | 40 | 50 |
| 8-H | 50 | 100 | — | 25 | PL-V | 50 | — |
| 8-I | 25 | 100 | — | 30 | PL-U | 72 | — |
| | | | | | PL-V | 10 | |
| 8-J | 25 | — | 100 | 30 | PL-U | 72 | — |
| | | | | | PL-V | 10 | |

TABLE 14

Summary of Printing and Transfer Results

| Trial | Printing and Transfer Results |
|---|---|
| 8-A | Very slight ribbon sticking, slightly light print, good washability |
| 8-B | Moderate ribbon sticking, tendency for third layer to separate |
| 8-C | Slightly light print, excellent washability |
| 8-D | Slightly light print, good washability, but some cracking of the transferred image after six washes |
| 8-E | Slight ribbon sticking, otherwise excellent performance |
| 8-F | Slight ribbon sticking, slight mottle in light print areas, good washability |
| 8-G | Slight ribbon sticking, otherwise excellent performance |
| 8-H | Slight ribbon sticking, light colors too dark, slight cracking of transferred image after six washes |
| 8-I | Light colors slightly dark, otherwise excellent performance |
| 8-J | Excellent results. Tried at third layer basis weights of 3.5, 6, and 14 gsm. All gave excellent results with higher basis weights giving darker colors. |

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A dye diffusion thermal transfer printable heat transfer material for receiving graphics or images produced by dye diffusion thermal transfer printing and for transferring said graphics or images to a substrate such as a fabric, said material comprising:

a first layer having first and second surfaces;

a second layer overlaying the first surface of said first layer, said second layer comprising a first thermoplastic polymer having a melt flow rate of at least about 15 g/10 minutes at a temperature of a 190° C. and a load of 2.16 kg; and a third layer overlaying said second layer, said third layer having an affinity for diffusion dyes, said third layer comprising a second thermoplastic polymer that softens when exposed to heat and returns to its original condition when cooled to ambient temperature, said second thermoplastic polymer having a glass transition temperature equal to or greater than about 30° C., said third layer further comprising a release agent for allowing said material to satisfactorily transfer said graphics or images to said substrate, wherein the release agent is a metal salt of a fatty acid.

2. The printable material of claim 1, in which the third layer further comprises from about 1 to about 40 parts by weight, per 100 parts by weight of the second thermoplastic polymer, of said release agent.

3. The printable material of claim 2, in which the release agent is present in an amount of from about 5 to about 30 parts by weight, per 100 parts by weight of the second thermoplastic polymer.

4. The printable material of claim 2, in which the third layer further comprises up to about 150 parts by weight, per 100 parts by weight of the second thermoplastic polymer, of a plasticizer.

5. The printable material of claim 4, in which the plasticizer is selected from the group consisting of phthalate and dibenzoate plasticers.

6. The printable material of claim 2, in which the third layer further comprises up to about 100 parts by weight, per 100 parts by weight of the second thermoplastic polymer, of a polymeric adhesion-transfer aid.

7. The printable material of claim 6, in which the polymeric adhesion-transfer aid is selected from the group consisting of ethylene-acrylic acid copolymers and ethylene-vinyl acetate copolymers.

8. The dye diffusion thermal transfer printable heat transfer material of claim 2, in which a backsize layer overlays the second surface of the first layer.

9. The dye diffusion thermal transfer printable heat transfer material of claim 2, in which a barrier layer is present between the first surface of the first layer and the second layer.

10. The printable material of claim 1, in which the first layer is selected from the group consisting of films and nonwoven webs.

11. The printable material of claim 10, in which the first layer is a nonwoven web.

12. The printable material of claim 11, in which the nonwoven web is a cellulosic nonwoven web.

13. The printable material of claim 12, in which the cellulosic nonwoven web is a paper.

14. The printable material of claim 13, in which the paper is a polymer-reinforced paper.

15. The printable material of claim 1, in which the first layer has a smoothness value no greater than about 150 cc/minute.

16. The printable material of claim 15, in which the second layer has a smoothness value no greater than about 100 cc/minute.

17. The printable material of claim 1, in which the third layer further comprises up to about 150 parts by weight, per 100 parts by weight of the second thermoplastic polymer, of a plasticizer.

18. The printable material of claim 17, in which the plasticizer is selected from the group consisting of phthalate and dibenzoate plasticizers.

19. The printable material of claim 1, in which the third layer further comprises up to about 100 parts by weight, per 100 parts by weight of the second thermoplastic polymer, of a polymeric adhesion-transfer aid.

20. The printable material of claim 19, in which the polymeric adhesion-transfer aid is selected from the group consisting of ethylene-acrylic acid copolymers and ethylene-vinyl acetate copolymers.

21. The dye diffusion thermal transfer printable heat transfer material of claim 1, in which a backsize layer overlays the second surface of the first layer.

22. The dye diffusion thermal transfer printable heat transfer material of claim 1, in which a barrier layer is present between the first surface of the first layer and the second layer.

23. The dye diffusion thermal transfer printable heat transfer material of claim 1 wherein said third layer comprises an ethylene-acrylic acid copolymer, a poly(vinyl chloride), and calcium stearate.

24. The dye diffusion thermal transfer printable heat transfer material of claim 23 wherein said third layer further comprises a plasticizer.

25. The dye diffusion thermal transfer printable heat transfer material of claim 1 wherein said first thermoplastic polymer comprises an ethylene-methacrylic acid copolymer and wherein said third layer comprises an ethylene-acrylic acid copolymer, a poly(vinyl chloride), and calcium stearate.

26. A dye diffusion thermal transfer printable heat transfer material which comprises:

a first layer having first and second surfaces and a smoothness value no greater than about 150 cc/minute;

a second layer overlaying the first surface of the first layer, which second layer has a smoothness value no greater than about 100 cc/minute and is comprised of a first thermoplastic polymer having a melt flow rate of at least about 15 g/10 minutes at a temperature of 190° C. and a load of 2.16 kg;

a third layer overlaying the second layer, which third layer is comprised of a second thermoplastic polymer having a glass transition temperature equal to or greater than about 30° C. and an affinity for diffusion dyes, and from about 1 to about 40 parts by weight, per 100 parts by weight of the second thermoplastic polymer, of a release agent which is a metal salt of a fatty acid.

27. The dye diffusion thermal transfer printable heat transfer material of claim 26, in which the release agent is present in an amount of from about 5 to about 30 parts by weight, per 100 parts by weight of the second thermoplastic polymer.

28. The dye diffusion thermal transfer printable heat transfer material of claim 26, in which the third layer further comprises up to about 150 parts by weight, per 100 parts by weight of the second thermoplastic polymer, of a plasticizer.

29. The dye diffusion thermal transfer printable heat transfer material of claim 28, in which the plasticizer is selected from the group consisting of phthalate and dibenzoate plasticizers.

30. The dye diffusion thermal transfer printable heat transfer material of claim 26, in which the third layer further comprises up to about 100 parts by weight, per 100 parts by weight of the second thermoplastic polymer, of a polymeric adhesion-transfer aid.

31. The dye diffusion thermal transfer printable heat transfer material of claim 30, in which the adhesion-transfer aid is selected from the group consisting of ethylene-acrylic acid copolymers and ethylene-vinyl acetate copolymers.

32. The dye diffusion thermal transfer printable heat transfer material of claim 26, in which a backsize layer overlays the second surface of the first layer.

33. The dye diffusion thermal transfer printable heat transfer material of claim 26, in which a barrier layer is present between the first surface of the first layer and the second layer.

34. The dye diffusion thermal transfer printable heat transfer material of claim 24, in which the first layer is selected from the group consisting of films and cellulosic nonwoven webs.

* * * * *